US006255791B1

(12) United States Patent
Ariav

(10) Patent No.: US 6,255,791 B1
(45) Date of Patent: Jul. 3, 2001

(54) ULTRASONIC METHOD AND APPARATUS FOR AUTOMATICALLY CONTROLLING MOVING DOORS

(75) Inventor: Arie Ariav, Doar Na Hof Ashkelon (IL)

(73) Assignee: Janus Development LTD, Ashkelon (IL)

( * ) Notice: Subject to any disclaimer, the term of this patent is extended or adjusted under 35 U.S.C. 154(b) by 0 days.

(21) Appl. No.: 09/245,742

(22) Filed: Feb. 8, 1999

(30) Foreign Application Priority Data

Feb. 8, 1998 (IL) ........................................ 123216

(51) Int. Cl.$^7$ ........................................ H02P 1/00
(52) U.S. Cl. ..................... 318/282; 318/468; 318/480; 49/25; 49/26; 49/31
(58) Field of Search ..................... 49/25–28, 31; 318/280–300, 445, 446, 466, 468, 480

(56) References Cited

U.S. PATENT DOCUMENTS

| 4,706,227 | 11/1987 | DuVall et al. . |
| 4,866,881 | * 9/1989 | Morrow et al. ........................... 49/25 |
| 4,894,952 | 1/1990 | Trett et al. . |
| 4,914,859 | * 4/1990 | Gionet et al. ........................... 49/25 |
| 5,428,278 | * 6/1995 | Bollengier et al. .................. 318/446 |
| 5,996,281 | * 12/1999 | Takano et al. ........................... 49/26 |

* cited by examiner

*Primary Examiner*—David S. Martin
(74) *Attorney, Agent, or Firm*—Benjamin J. Barish; Sol Sheinbein

(57) ABSTRACT

Method and apparatus for automatically controlling the opening and closing of a door by: (a) ultrasonically monitoring a predetermined approach area located in front of the door for the entry of an object into the approach area and the movement of the object towards the closed door; (b) ultrasonically monitoring a predetermined opening-door protect area laterally outwardly of the outer end of the closed door, and a predetermined closing-door protect area inwardly of the inner end of the door for the presence of an object in the opening-door and closing-door protect areas; and (c) controlling a drive in response to the above monitoring operations.

20 Claims, 7 Drawing Sheets

ULTRASONIC METHOD AND APPARATUS FOR AUTOMATICALLY CONTROLLING MOVING DOORS

FIELD AND BACKGROUND OF THE INVENTION

The present invention relates to an ultra sonic method and apparatus for automatically controlling the opening and closing of moving doors, particularly sliding doors.

Automatic door control systems are gaining wide-spread use in order to control traffic into or out of enclosed spaces which are heated or cooled by airconditioning systems. Such door control systems not only must detect and respond to objects moving towards the closed doors, but must also provide protection against injury by a closing or opening door, and further, should minimize the time the door is in the open condition in order to minimize wastage of the energy used for airconditioning the enclosed space.

OBJECTS AND BRIEF SUMMARY OF THE INVENTION

An object of the present invention is to provide an ultrasonic method and apparatus for automatically controlling the opening and closing of doors having advantages in the above respects.

According to one aspect of the present invention, there is provided a method of automatically controlling the opening and closing of a door movable over a floor, and a drive for driving the door to its open and closed positions, comprising the following operations: (a) ultrasonically monitoring a predetermined approach area located in front of the door for the entry of an object into the approach area and the movement of the object towards the closed door; (b) ultrasonically monitoring a first predetermined lateral area laterally outwardly of the outer end of the closed door, and a second predetermined lateral area inwards of the inner end of the door for the presence of an object in the opening-door and closing-door protect areas; and (c) controlling the drive in response to the monitoring operations.

According to further features in the described preferred embodiment, monitoring the predetermined approach area is performed by a first group of ultrasonic transceivers spaced along the door and directed at an acute angle towards the floor; whereas monitoring the protect area is performed by a second group of ultrasonic transceivers spaced along the door and directed substantially perpendicularly towards the floor.

According to another aspect of the present invention, there is provided a method of automatically controlling the opening and closing of a door movable over a floor, and a drive for driving the door to its open and closed positions, comprising, ultrasonically monitoring a predetermined approach area located in front of the door by: (i) dividing the predetermined approach area into a plurality of strips; (ii) dividing each strip into a plurality of cells, to thereby define a matrix of cells; (iii) detecting the presence of an object in any of the matrix of cells; (iv) detecting the center of gravity of all the cells in which an object is detected; (v) monitoring the movement of the detected center of gravity with respect to the door; and (vi) controlling the drive to open the door when the detected center of gravity is determined to be moving towards, and at a predetermined speed towards or within a predetermined distance from, the closed door.

As will be described more particularly below, such a method may be implemented by an expansible modular construction by providing an ultrasonic head for each strip of the approach area and by processing the output of each head in a separate channel. Also, the novel method avoids the need to discriminate between different sensors (e.g., by frequency or time discrimination), and also the need to distinguish between many objects in the approach area. Such a method also distinguishes cross-traffic (traffic moving substantially parallel to the doors) which should not open the doors, from approaching traffic which should open the doors.

The invention also provides apparatus for automatically controlling the opening and closing of doors in accordance with the above method.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
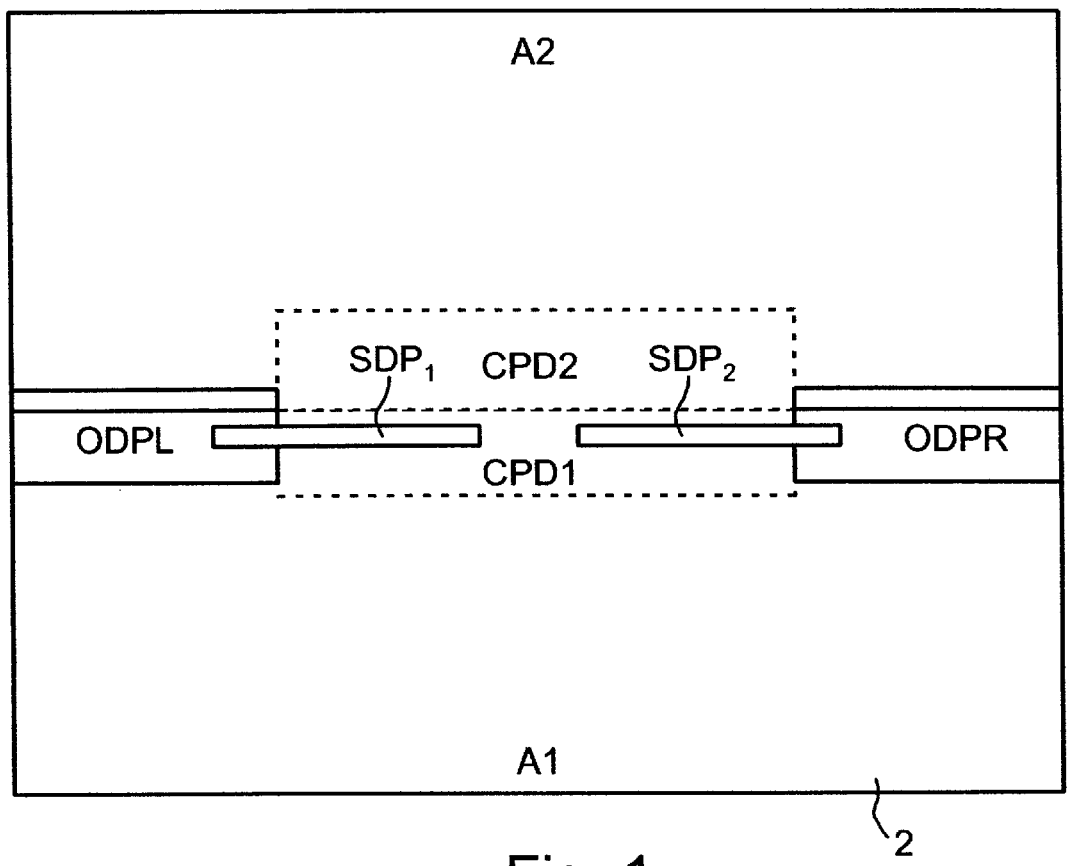
FIG. 1 is a typical door area diagram which will be helpfull in explaining the present invention.

FIG. 1 diagramatically illustrates, in top plan view, a sliding door in the form of a pair of sliding door panels $SDP_1$, $SDP_2$ movable to their closed positions and to their open positions over a floor 2 to control the flow of traffic through a passageway defined by the door panels. The area on each side of the two sliding door panels $SDP_1$, $SDP_2$, is divided into the following: a predetermined approach area A1, A2 located in front of the sliding door panels on each side thereof; a first predetermined lateral area, sometimes referred to below as an opening-door protect area ODPL (left), ODPR (right), laterally outwardly of the outer ends of the sliding door panels when in their closed positions; and a second predetermined lateral area, sometimes referred to below as a closing-door protect area CDP1, CDP2, between the inner ends of the sliding door panels when in their open positions.

As will be described more particularly below, the approach areas A1, A2 are continuously monitored for the entry of an object therein, and for the movement of the object towards the closed sliding door panels, to open them at the proper time. The opening-door protect areas ODPL, ODPR are continuously monitored such that the presence of an object in those areas when the doors are to open will produce a slow opening of the doors; and the closing-door protect areas CDP1, CDP2 are also continuously monitored such that the presence of an object in those areas when the doors are to close will interrupt the closing of the doors and will reopen them.

Figure 2:
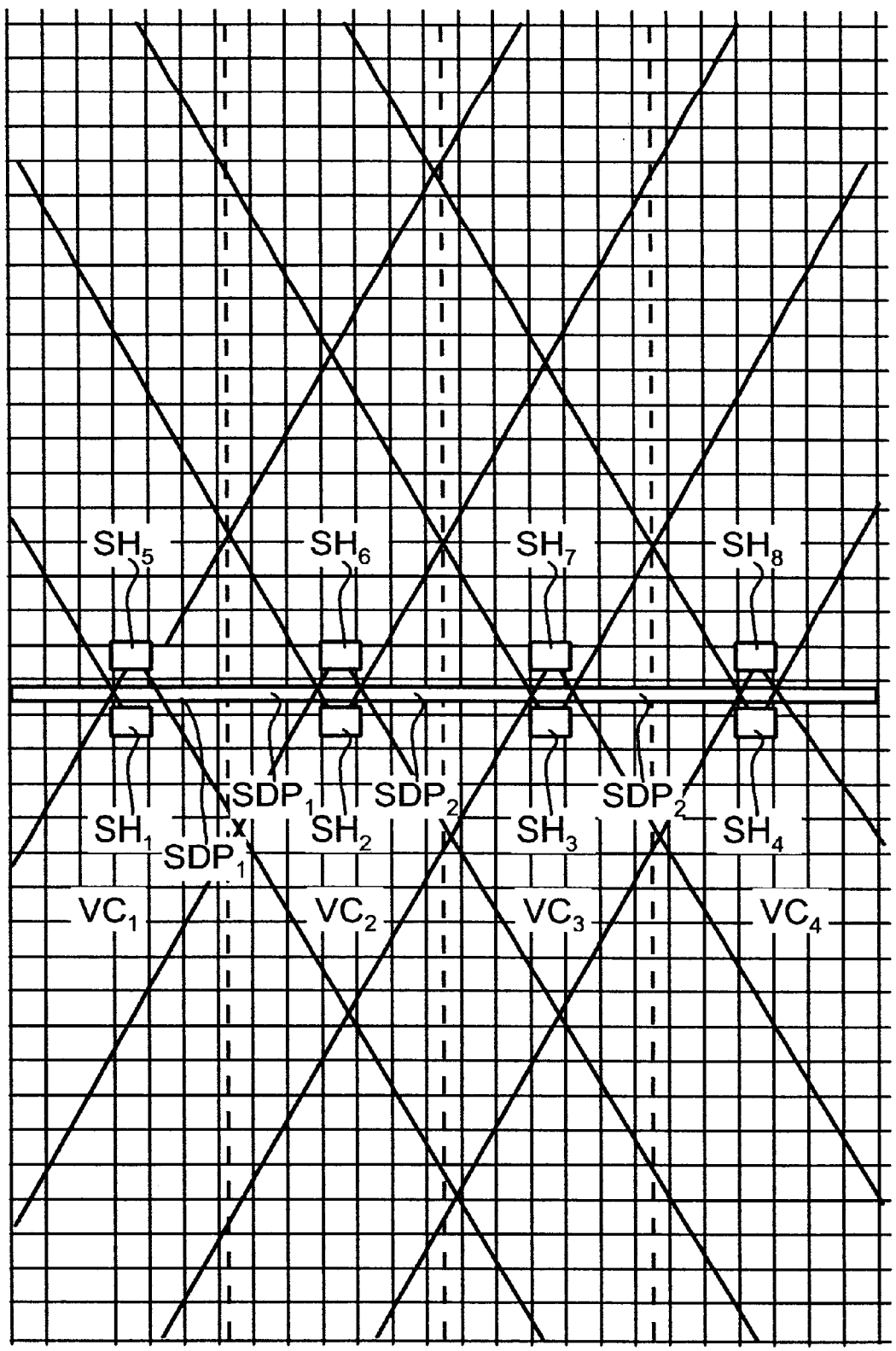
FIG. 2 is a top plan view diagramatically illustrating one implementation of the present invention utilizing four sensor heads on each side of the door to be controlled.

The monitoring of the areas illustrated in FIG. 1 is effected by apparatus of a modular construction which, in the illustrated example, includes eight sensor heads $SH_1$–$SH_8$ carried on opposite sides of the frame spaced along the sliding door panels $SDP_1$, $SDP_2$. Thus, as shown in FIG. 2, four sensor heads $SH_1$–$SH_4$ are located over the sliding door panels to face one side of the passageway defined by the door panels, and the remaining sensor heads $SH_5$–$SH_8$ are spaced over the sliding door panels facing the opposite side of the passageway. The two end sensor heads $SH_1$, $SH_5$ are located centrally of the sliding door panel $SDP_1$ in its open position; sensor heads $SH_2$, $SH_6$ are located centrally of the sliding door panel $SDP_1$ in its closed position; sensor heads $SH_3$, $SH_7$ are located centrally of the sliding door panel $SDP_2$ in its closed position; and sensor heads $SH_4$, $SH_8$ are located centrally of sliding door panel $SDP_2$ in its open position.

As will be described more particularly below with respect to FIGS. 3 and 4, each sensor head $SH_1$–$SH_8$ includes three sensors, each in the form of an ultrasonic transceiver. One sensor in each head is used for monitoring the approach area A1, A2 (FIG. 1); and the other two sensors in each head are used for monitoring the opening-door protect areas ODPL, ODPR and the closing-door protect areas CDP1, CDP2.

As further shown in FIG. 2, each of the approach areas A1, A2 on the opposite sides of the sliding door panels $SDP_1$. $SDP_2$, is divided into a plurality of strips, one for each head, with each strip divided into a plurality of cells to define a matrix of cells. In this case, the cells are arranged in four vertical strips or columns $VC_1$–$VC_4$, each defined by one head located at either the open position or the closed position of one of the two sliding door panels $SDP_1$, $SDP_2$. The matrix further includes a plurality of horizontal rows, in this case 20 horizontal rows, $HR_1$–$HR_{20}$. As one example, the approach area A1, A2 on each side of the sliding door panels may be 340 cm, in which case the height of each row would be 17 cm.

Figure 3:
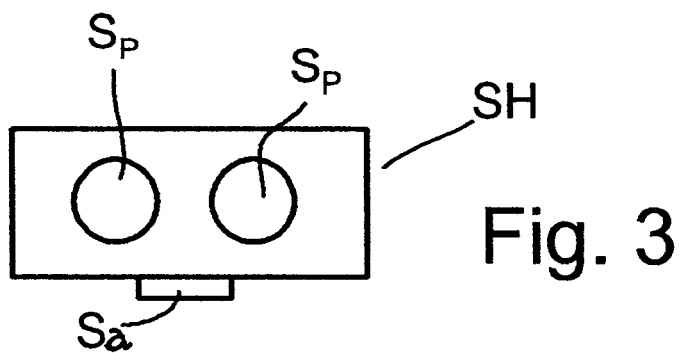
FIG. 3 is a bottom plan view of one of the eight sensor heads in the implementation of FIG. 2.
Figure 4:
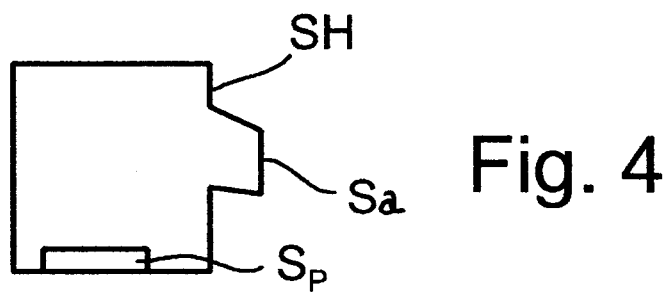
FIG. 4 is a side elevational view of the sensor head of FIG. 3.
Figure 5:
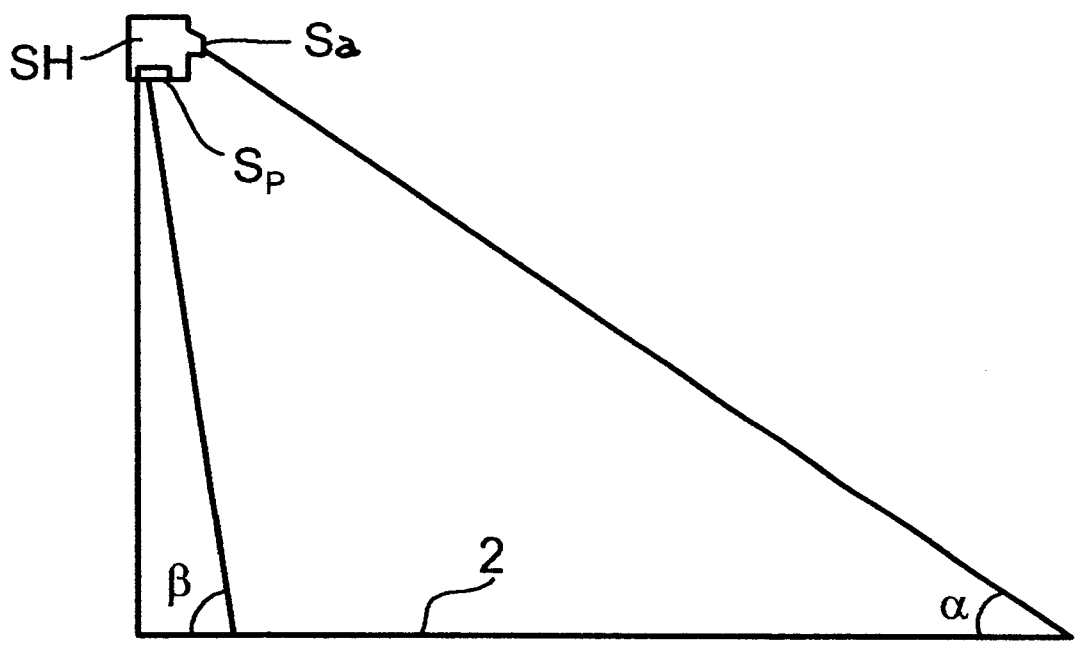
FIG. 5 is a side view diagramatically illustrating the angular deployment of the sensor heads in the implementation of FIG. 2.

FIGS. 3 and 4 illustrate the construction of each of the sensor heads $SH_1$–$SH_8$; and FIG. 5 diagramatically illustrates the angular deployment of the sensor heads with respect to the floor 2 in the area being monitored.

Thus, as shown in FIGS. 3 and 4, each sensor head, therein designated SH, includes one approach sensor Sa and two protect sensors Sp. As shown in FIG. 5, the approach sensor Sa is a wide-angle ultrasonic transceiver outputting a wide conical beam (e.g., 60°) and is oriented with respect to the floor such that its outer ray is at an acute angle (e.g., about 30°) with respect to the floor 2 to thereby cover the complete approach area (A1, A2, FIG. 1). Each protect sensor Sp is a similar ultrasonic transceiver outputting a conical beam but substantially perpendicularly to the floor 2 adjacent to the sliding door panels $SDP_1$, $SDP_2$. In the example illustrated in FIG. 5, the protect sensors Sp output a 60° ultrasonic beam, with its central axis perpendicular to the floor, but only one-half the beam is utilized on each side of the sliding door panels so that the angle of its outer ray with respect to the floor 2 is approximately 60°.

It will be appreciated that the protect sensors $S_p$ in the end sensor heads ($SH_1$, $SH_5$, $SH_4$, $SH_8$) monitor the opening-door protect areas ODPL, ODPR (FIG. 1); and that the protect sensors $S_p$ in the remaining middle sensor heads monitor the closing-door protect areas $CDP_1$, $CDP_2$. On the other hand, all the approach sensors Sa on one side of the sliding door panels monitor the complete approach area, A1 or A2, on the respective side.

Figure 6:
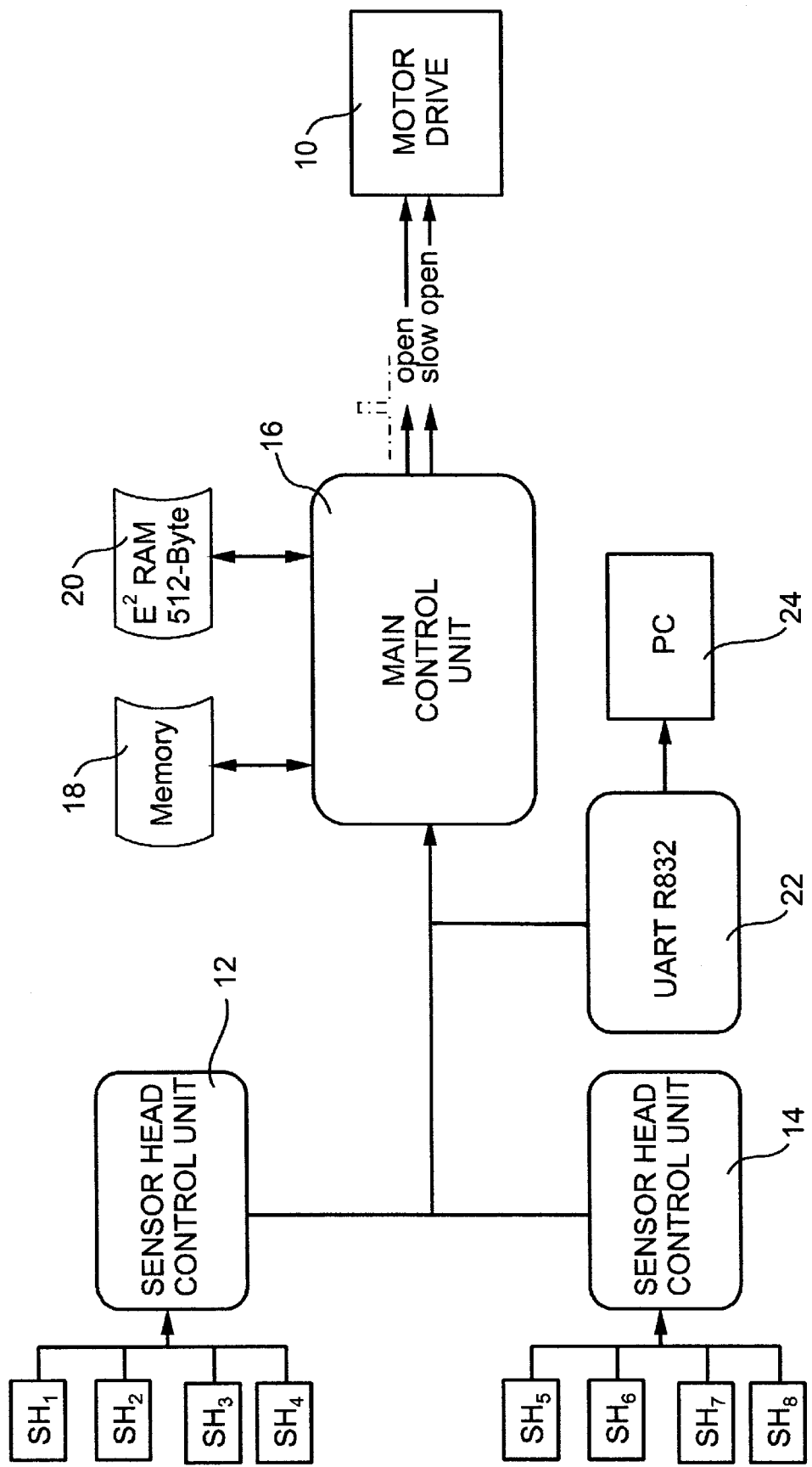
FIG. 6 is a block diagram illustrating one form of overall apparatus constructed in accordance with the present invention.

FIG. 6 illustrates the overall control system for controlling the motor drive 10 in response to the objects detected by the sensor heads $SH_1$–$SH_4$ on one side of the sliding door panels, and the sensor heads $SH_5$–$SH_8$ on the opposite side of the sliding door panels. The control system illustrated in FIG. 6 includes a sensor head control unit 12 connected to the first group of sensor heads $SH_1$–$SH_4$, and a second sensor head control unit 14 connected to the second group of sensor heads $SH_5$–$SH_8$. The two sensor head control units 12, 14, feed a main control unit 16 which controls the motor drive 10 for driving the sliding door panels $SDP_1$, $SDP_2$ to their open and closed positions.

The control system illustrated in FIG. 6 further includes an external memory 18 for storing the data being processed in the main control unit 16; a 512-byte $E^2$ RAM 20 for storing data in a non-volatile manner; and an UART RS232 (Universal Asynchronous Receiver Transmitter) for interfacing the control system with an external computer 24 for remote monitoring via an RS-232 interface.

Figure 7:
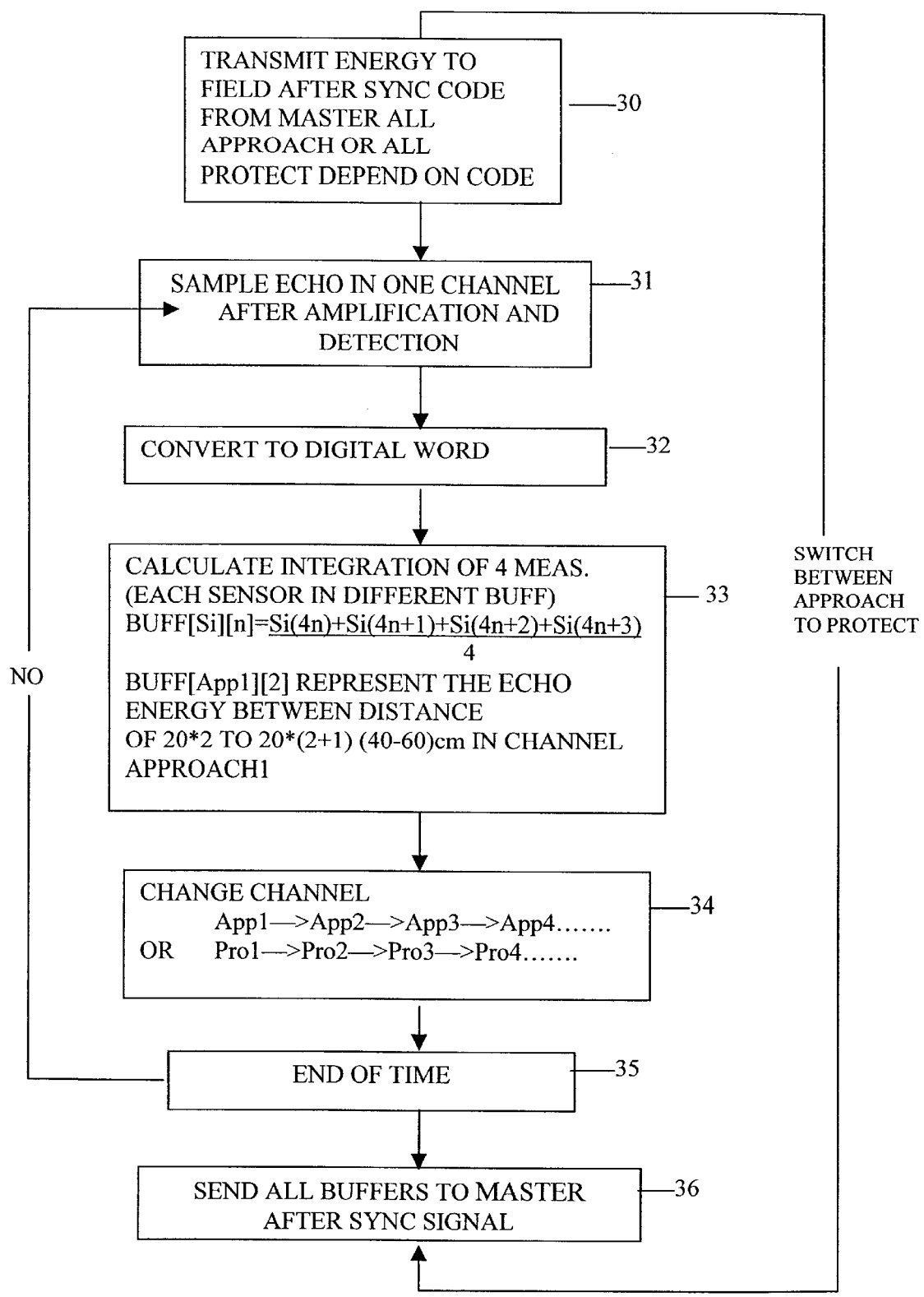
FIG. 7 is a flow chart illustrating the operation of each of the two sensor head processors connected to the four sensor heads on each side of the door.
Figure 8A:
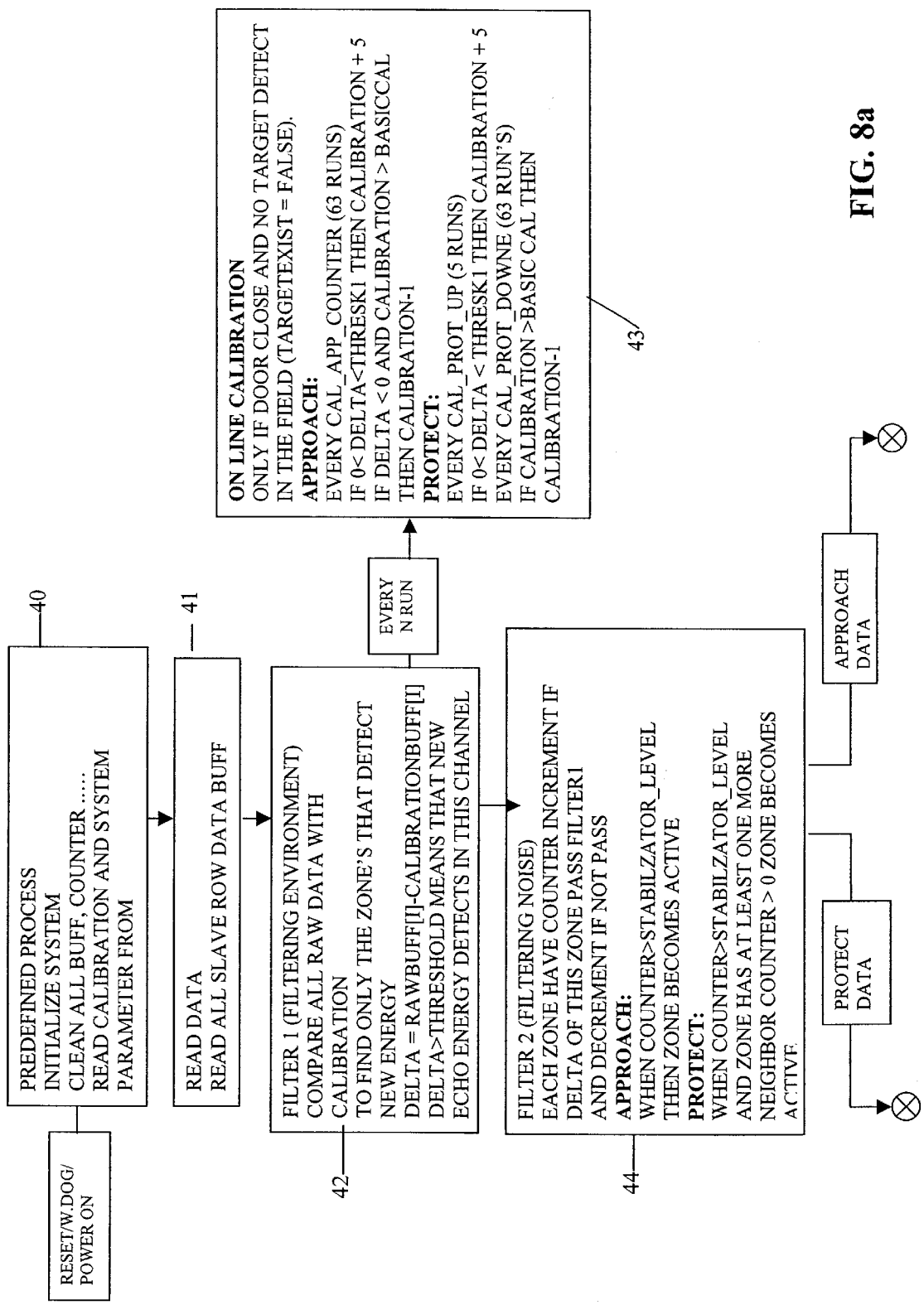
FIGS. 8a and 8b, taken together, constitute a flow chart illustrating the manner in which the doors are controlled by the main processor.
Figure 8B:
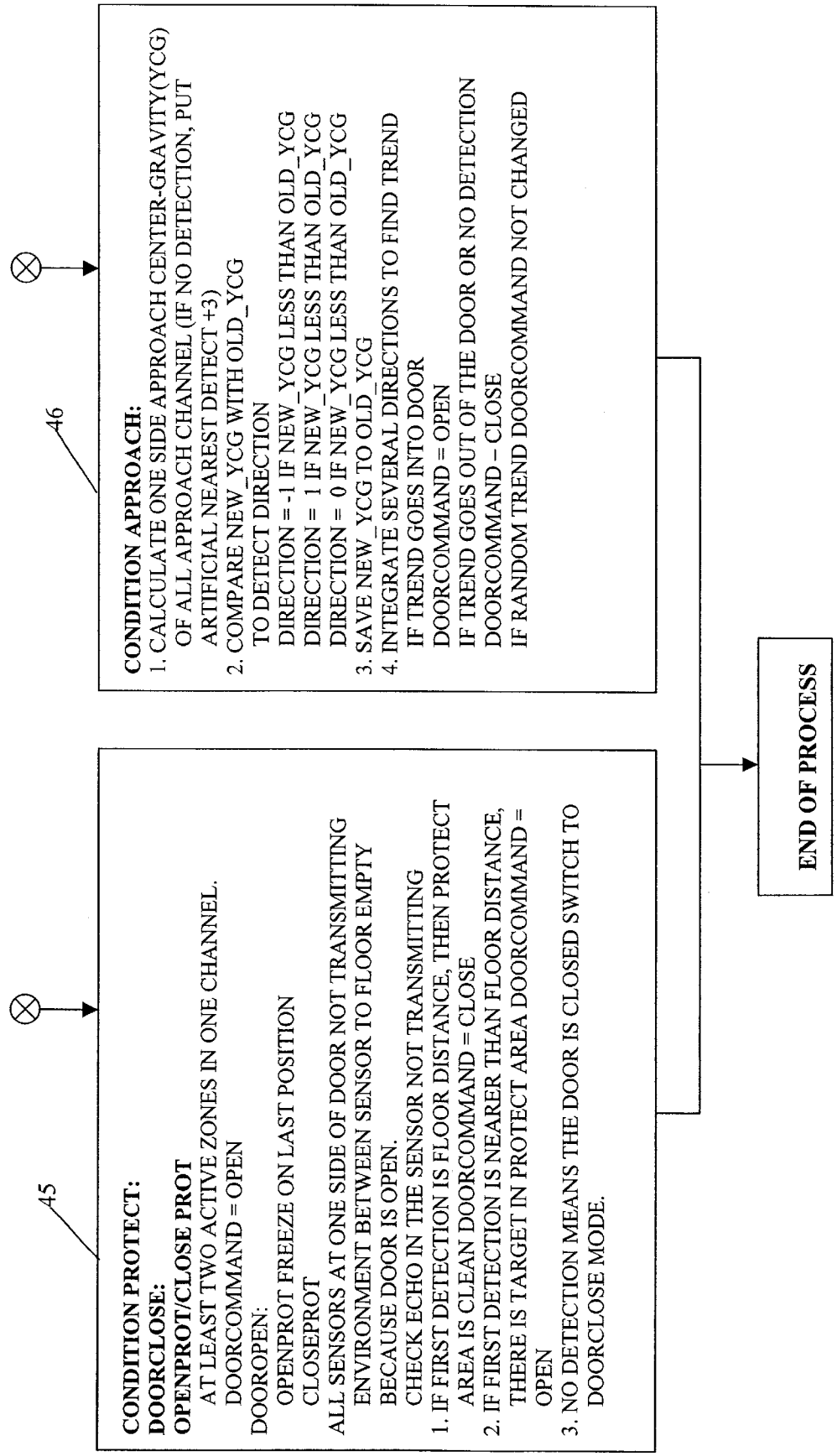

The operation of each of the sensor head control units 12, 14, is illustrated by the flow chart in FIG. 7; and the operation of the main control unit 16 is illustrated by the flow chart of FIGS. 8a and 8b.

As one example, each of the sensor head control units 12, 14, may be microcontroller PIC16c73 by Microchip; and the main control unit 16 may be microcontroller PIC17cxx by Microchip.

OPERATION

As described earlier, the illustrated system is of a modular construction including the appropriate number of sensor heads SH, and processing circuitry therefor, corresponding to the size of the door passageway to be monitored. In the example illustrated, there are four sensor heads on each side of the passageway. Each of the eight sensor heads $SH_1$–$SH_8$ includes an ultrasonic transceiver for monitoring the approach area ($A_1$, $A_2$, FIG. 1) and two ultrasonic transceivers for monitoring the two protect areas, namely the opening-door protect areas ODPL, ODPR, laterally of the sliding door panels $SDP_1$, $SDP_2$, and the closing-door protect areas $CDP_1$, $CDP_2$ between the two sliding door panels.

Each such transceiver includes a transmitter, a receiver, an amplifier and an analog-to-digital converter for detecting objects within the respective area, by their echoes, and for outputting measurement data representing the locations of the respective objects. These transceivers, for example, may be piezoelectrical devices operating at an ultrasonic frequency of 40 kHz.

The flow chart of FIG. 7 illustrates the operation of each of the two sensor head control units 12, 14, serving the two groups of sensor heads $SH_1$–$SH_4$ and $SH_5$–$SH_8$ on opposite sides of the sliding door panels $SDP_1$, $SDP_2$. Thus, as shown in FIG. 7, each transceiver transmits a pulse (block 30), receives its echo (block 31), and converts the energy level of the received echo to digital form (block 32). The processor then processes the digital form of the received energy according to the operations set forth in block 33.

The foregoing operations are performed sequentially with respect to the data received by each of the four approach sensors Sa and then by the four protect sensors Sp (block 34). At the end of the sampling time (block 35), all the data accumulated in their respective buffers is sent to the main control unit 16 (block 36).

As shown by the flow chart of FIG. 8a, the main control unit 16 performs a predefined process in which it initializes the systems, cleans all the buffers, counters, etc., and reads the calibration and system parameters from the non-volatile memory 20. These calibration and system parameters are obtained during a short Study Procedure after installation of the system, in which the transceivers are operated, and the echo data accumulated for about 30 seconds while the door is forced to close and open upon itself. This data is stored and is used as the "data base" for comparison with the operational data obtained during the normal operation of the system.

Thus, during the normal operation of the system, the data received from the eight sensor heads $SH_1$–$SH_8$ via their control units 12, 14, is read (block 41), and is compared with the previously-recorded data obtained during the Study Procedure (block 40). The latter data serves as threshold values in order to filter out the object-derived echo signals from the environmental noise signals produced by the door, wall, floor, etc. (block 42). Preferably, dynamic thresholding is used in which the threshold values are dynamically recalibrated every Nth (e.g., 10th) run (block 43).

The main control unit 16 then performs a second filtering operation (block 44) by averaging a predetermined number of signals (e.g., 10), with respect to the approach sensors Sa and the protect sensors Sp, in order to further reduce the noise (since noise tends to be random), and also to increase the signal strength.

The so-filtered data is then used to control the sliding door panels $SDP_1$, $SDP_2$ in the manner illustrated by blocks 45 and 46 in FIG. 8b, as follows:

Block 45 illustrates the operations performed on the data sensed by the protect sensors Sp which, as described earlier, are used for sensing the presence of an object in either of the opening-door protect areas ODPL, ODPR when a closed door is to be opened, or in the closing-door protect areas CBD1, CBD2 when an open door is to be closed. As shown by block 45 the sensors on one side of the door are used for transmission, and those on the other side for reception. If the first detection is the floor distance, this means that there is no obstacle in the respective area, and therefore the door may be closed or opened, according to the command. On the other hand, if an echo is detected at a shorter distance than the floor distance, this indicates there is an object in the protected area, and the door will be controlled accordingly.

Block 46 (FIG. 8b) sets forth the basic operations performed by processing the data received by the approach sensors. For each object detected by the approach sensors $Sa_1$–$Sa_8$ in the eight sensor heads $SH_1$–$SH_8$, all the cells for a detected object are identified. Thus, a large physical object will be detected in a large number of contiguous (bordering) cells in the approach area $A_1$, $A_2$ as illustrated in FIGS. 1 and 2, whereas a small object will be detected in only a single cell, or a relatively few cells.

The main control unit then determines the center of gravity of all the cells in which an object is detected and continuously monitors the movement of that center of gravity to determine whether it moves within a predetermined distance from and towards the doors, or at a predetermined velocity towards the doors, while the doors are closed. Block 46 in FIG. 8b more particularly illustrates how the approach area is monitored by the approach sensors, and the center-of-gravity of the cells of the detected objects is used for controlling the opening of the doors. The doors are automatically closed a predetermined time interval after opening, unless an object is detected in the closing-door protect regions CPD1, CPD2.

The foregoing system provides a number of important advantages. Thus, by determining and monitoring the movements of the center of gravity of the cells in the approach area in which an object was detected, the system is considerably simplified since it operates on the basis of analysing a trend rather than analysing each received signal. Thus, the system does not have to distinguish between the many different types of objects in the approach area, and also avoids the need to discriminate between different sensors, e.g., by frequency or time discrimination. Further, the system can distinguish between cross-traffic, i.e., traffic moving parallel to the closed doors and therefore not to open them, from approaching traffic moving towards the doors which is to automatically open the doors. In addition, one set of sensors may be used as transmitters on one side of the door, when the door is open, and the other set of transmitters may be used as receivers, which better identifies objects present in or moving through the door passageway. Finally, the modular construction permits the system to be easily tailored in size according to the requirements for any particular application.

While the invention has been described with respect to sliding doors, which represents one preferred embodiment, it will be appreciated that this is set forth merely for purposes of example, and that the invention could be incorporated also in swinging doors, and that many other variations, modifications and applications of the invention may be made.

What is claimed is:

1. A method of automatically controlling the opening and closing of a door movable over a floor, and a drive for driving said door to its open and closed positions, said door having a predetermined approach area located in front of the door, a first predetermined lateral area laterally outwardly of the outer end of the door when in its closed position, and a second predetermined lateral area laterally inwardly of the inner end of the door when in its opened position; comprising the following operations:
   (a) ultrasonically monitoring said predetermined approach area located in front of said door for the entry of an object into said approach area and the movement of the object towards the closed door;
   (b) ultrasonically monitoring said first predetermined lateral area laterally outwardly of the outer end of the closed door, and second predetermined lateral area inwardly of the inner end of the open door, for the presence of an object in said predetermined lateral areas; and
   (c) controlling said drive in response to said monitoring operations.

2. The method according to claim 1, wherein said monitoring operation (a) includes:
   (i) dividing the predetermined approach area into a plurality of strips;
   (ii) dividing each strip into a plurality of cells, to thereby define a matrix of cells;
   (iii) detecting the presence of an object in any of said matrix of cells;
   (iv) detecting the center of gravity of all the cells in which an object is detected;
   (v) monitoring the movement of said detected center of gravity with respect to the door; and (vi) controlling said drive to open said door when said detected center of gravity is determined to be moving towards, and within a predetermined distance from, said closed door.

3. The method according to claim 2, wherein said monitoring operation (a) is performed by a first group of ultrasonic transceivers spaced along said door and directed at an acute angle towards the floor.

4. The method according to claim 3, wherein said operation (b) is performed by a second group of ultrasonic transceivers spaced along said door and directed substantially perpendicularly towards the floor.

5. The method according to claim 4, wherein each of said first group of ultrasonic transceivers is mounted in a transceiver head which also includes at least one of said second group of ultrasonic transceivers.

6. The method according to claim 5, wherein each of said transceiver heads includes one of said first group of ultrasonic transceivers, and a pair of said second group of ultrasonic transceivers.

7. A method of automatically controlling the opening and closing of a door movable over a floor, and a drive for driving said door to its open and closed positions, comprising, ultrasonically monitoring a predetermined approach area located in front of said door by:
   (i) dividing the predetermined approach area into a plurality of strips;
   (ii) dividing each strip into a plurality of cells, to thereby define a matrix of cells;
   (iii) detecting the presence of an object in any of said matrix of cells;
   (iv) detecting the center of gravity of all the cells in which an object is detected;
   (v) monitoring the movement of said detected center of gravity with respect to the door; and
   (vi) controlling said drive to open said door when said detected center of gravity is determined to be moving towards, and at a predetermined speed towards or within a predetermined distance from, said closed sliding door.

8. The method according to claim 7, wherein said monitoring operation is performed by a first group of ultrasonic transceivers spaced along said door and directed at an acute angle towards the floor.

9. The method according to claim 7, wherein said method further comprises:
   ultrasonically monitoring a predetermined opening-door protect area laterally outwardly of the outer end of the closed door, and a predetermined closing-door protect area at the inner end of the door, for the presence of an object in said opening-door and closing-door protect areas;
   and controlling said drive also in response to said latter monitoring operations.

10. Apparatus for automatically controlling the opening and closing of a door having at least one sliding door panel movable over a floor, said door having a predetermined approach area located in front of the door, a first predetermined lateral area laterally outwardly of the outer end of the door when in its closed positions and a second predetermined lateral area laterally inwardly of the inner end of the door when in its opened position; comprising:
   a drive for driving said sliding door to its open and closed positions;
   an ultrasonic monitoring system for monitoring:
   (a) said predetermined approach area located in front of said sliding door for the entry of an object into said approach area, and the movement of the object towards the closed sliding door;
   (b) said first predetermined lateral area laterally outwardly of the outer end of the closed sliding door for the presence of an object in said latter area; and
   (c) said second predetermined lateral area at the inner end of the sliding door for the presence of an object in said latter area;
   and a control system for controlling said drive in response to said monitoring operations.

11. The apparatus according to claim 10, wherein said monitoring system monitors said predetermined approach area by:
   (i) dividing the predetermined approach area into a plurality of strips;
   (ii) dividing each strip into a plurality of cells, to thereby define a matrix of cells;
   (iii) detecting the presence of an object in any of said matrix of cells;
   (iv) detecting the center of gravity of all cells in which an object is detected; and
   (v) monitoring the movement of said detected center of gravity with respect to the closed sliding door;
   and wherein said control system controls said drive to open said sliding door when said detected center of gravity is determined to be moving towards, and at a predetermined speed towards or within a predetermined distance from, said closed sliding door panels.

12. The apparatus according to claim 11 wherein said monitoring system for monitoring said predetermined approach area includes a first group of ultrasonic transceivers spaced along said sliding door and directed at an acute angle towards the floor.

13. The apparatus according to claim 12, wherein said monitoring system for monitoring said predetermined lateral areas includes a second group of ultrasonic transceivers along said sliding door and directed substantially perpendicularly towards the floor.

14. The apparatus according to claim 13, wherein said system is a modular system comprising, for each strip, a transducer head which includes at least one of said first group of ultrasonic transceivers and at least one of said second group of ultrasonic transceivers.

15. The apparatus according to claim 14, wherein each of said transceiver heads includes a pair of said second group of ultrasonic transceivers.

16. Apparatus for automatically controlling the opening and closing of a door having at least one sliding door panel movable over a floor, comprising:
   a drive for driving said sliding door to its open and closed positions;
   and a monitoring system for controlling said drive;
   said monitoring system monitoring a predetermined approach area located in front of said sliding door by:
   (i) dividing the predetermined approach area into a plurality of strips;
   (ii) dividing each strip into a plurality of cells, thereby defining a matrix of cells;
   (iii) detecting the presence of an object in any of said matrix of cells;
   (iv) detecting the center of gravity of all the cells in which an object is detected; and
   (v) monitoring the movement of said detected center of gravity with respect to the closed sliding door;

said control system controlling said drive to open said sliding door when said detected center of gravity is determined to be moving towards, and at a predetermined speed towards or within a predetermined distance from, said closed sliding door.

17. The apparatus according to claim 16, wherein said monitoring system includes a first group of ultrasonic transceivers spaced from each other over said sliding door and directed at an acute angle towards the floor.

18. The apparatus according to claim 16, wherein monitoring system further monitors a predetermined opening-door protect area laterally outwardly of the outer end of the closed sliding door for the presence of an object in said opening-door protect area, and a predetermined closing-door protect area at the inner end of the sliding door panels for the presence of an object in said closing-door protect area.

19. The apparatus according to claim 18, wherein said monitoring system includes a plurality of ultrasonic heads spaced along said sliding door panels each including a first ultrasonic transceiver for monitoring said approach area, and a second ultrasonic transceiver for monitoring said protect areas.

20. The apparatus according to claim 19, wherein said first ultrasonic transceiver is oriented at an acute angle with respect to the floor, and said second ultrasonic transceiver is oriented substantially perpendicularly to the floor.

* * * * *